E. STRETCH.
AUTOMOBILE HOIST.
APPLICATION FILED NOV. 10, 1915.
1,205,490.
Patented Nov. 21, 1916.
3 SHEETS—SHEET 1.
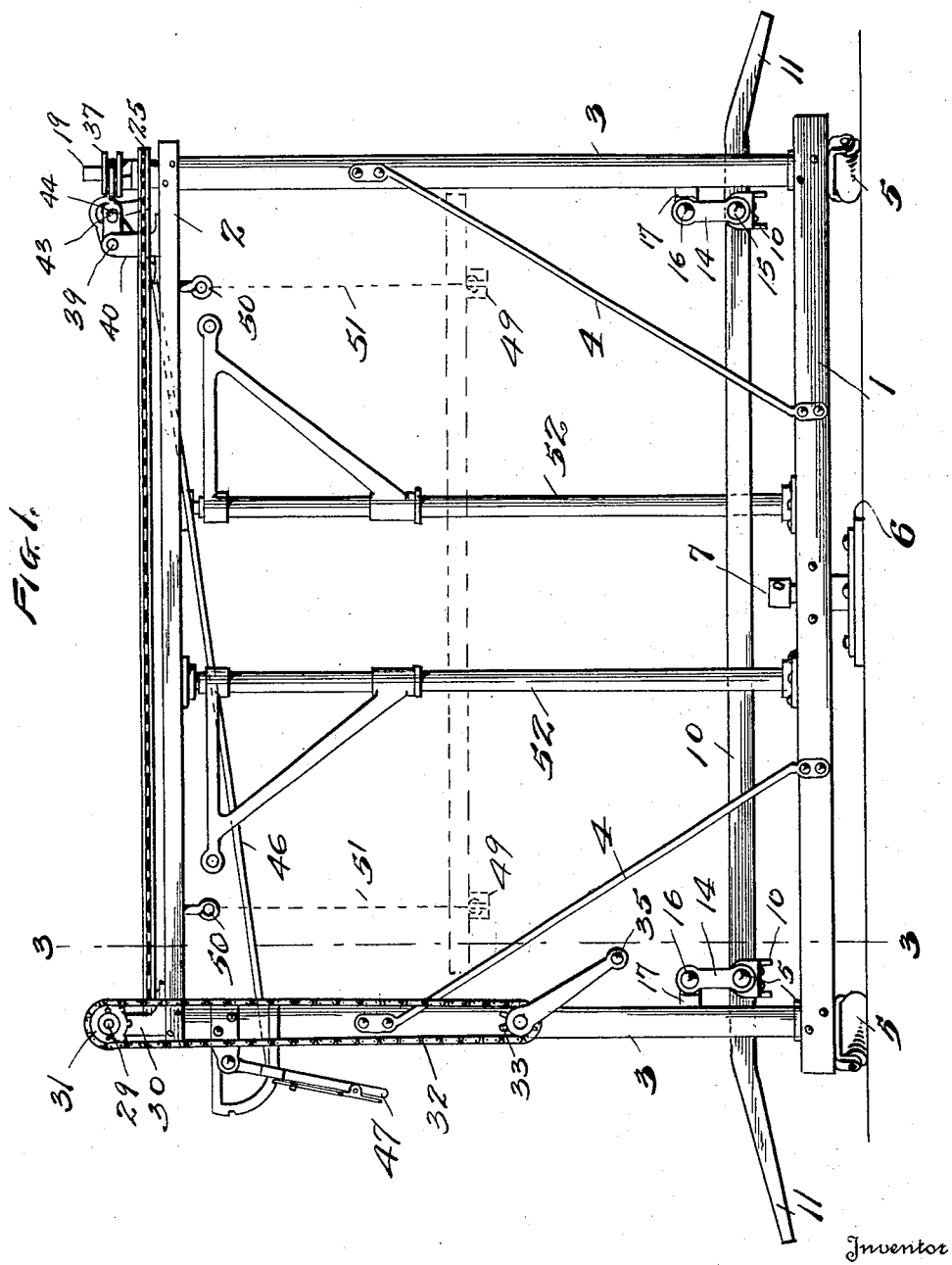
Witnesses
C. T. Davis
M. E. Moore
Inventor
EUGENE STRETCH
Attorney E. STRETCH.
AUTOMOBILE HOIST.
APPLICATION FILED NOV. 10, 1915.
1,205,490.
Patented Nov. 21, 1916.
3 SHEETS—SHEET 2.
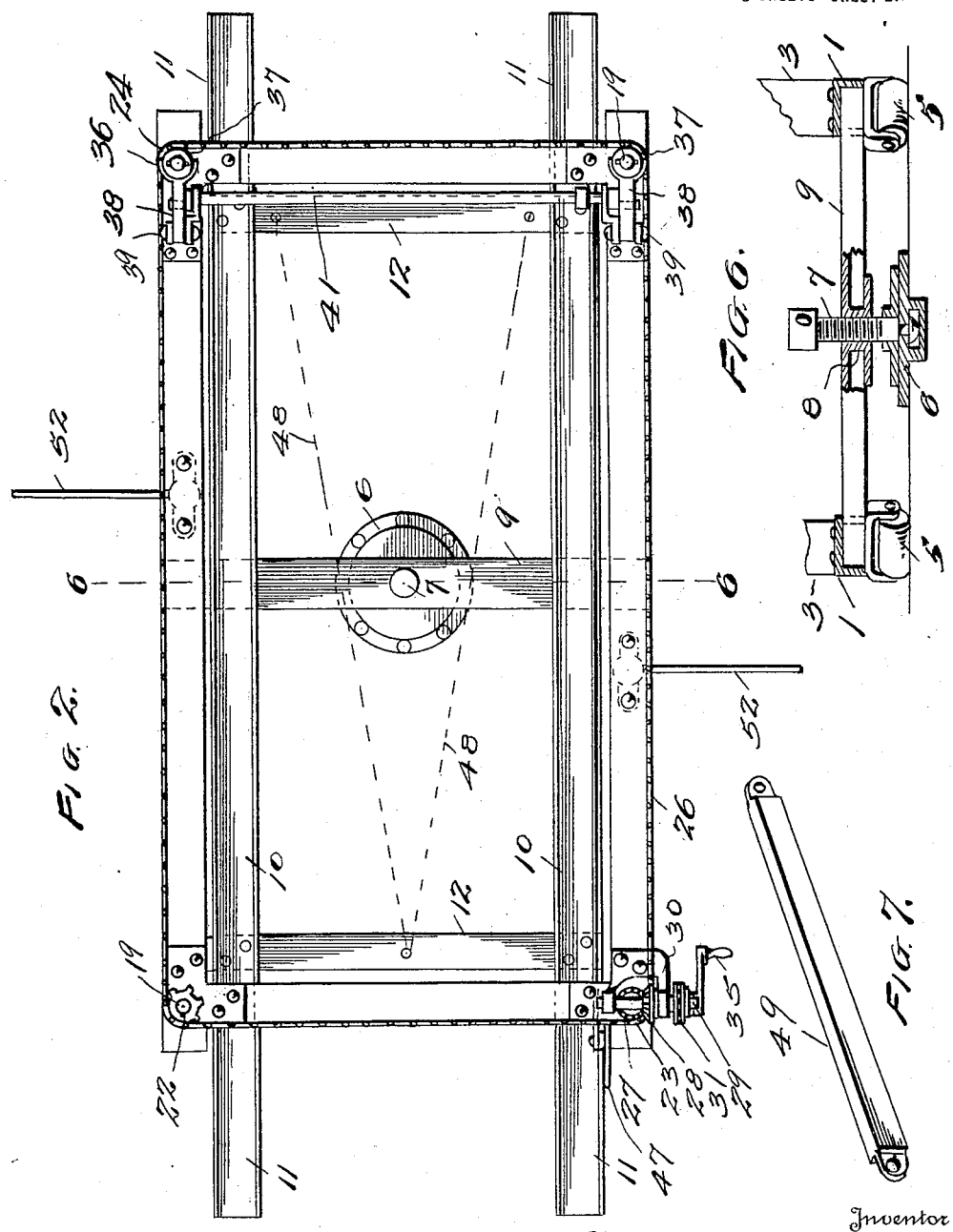
Witnesses
C. K. Davis
M. E. Moore
Inventor
EUGENE STRETCH
By 
Attorney E. STRETCH.
AUTOMOBILE HOIST.
APPLICATION FILED NOV. 10, 1915.
1,205,490.
Patented Nov. 21, 1916.
3 SHEETS—SHEET 3.
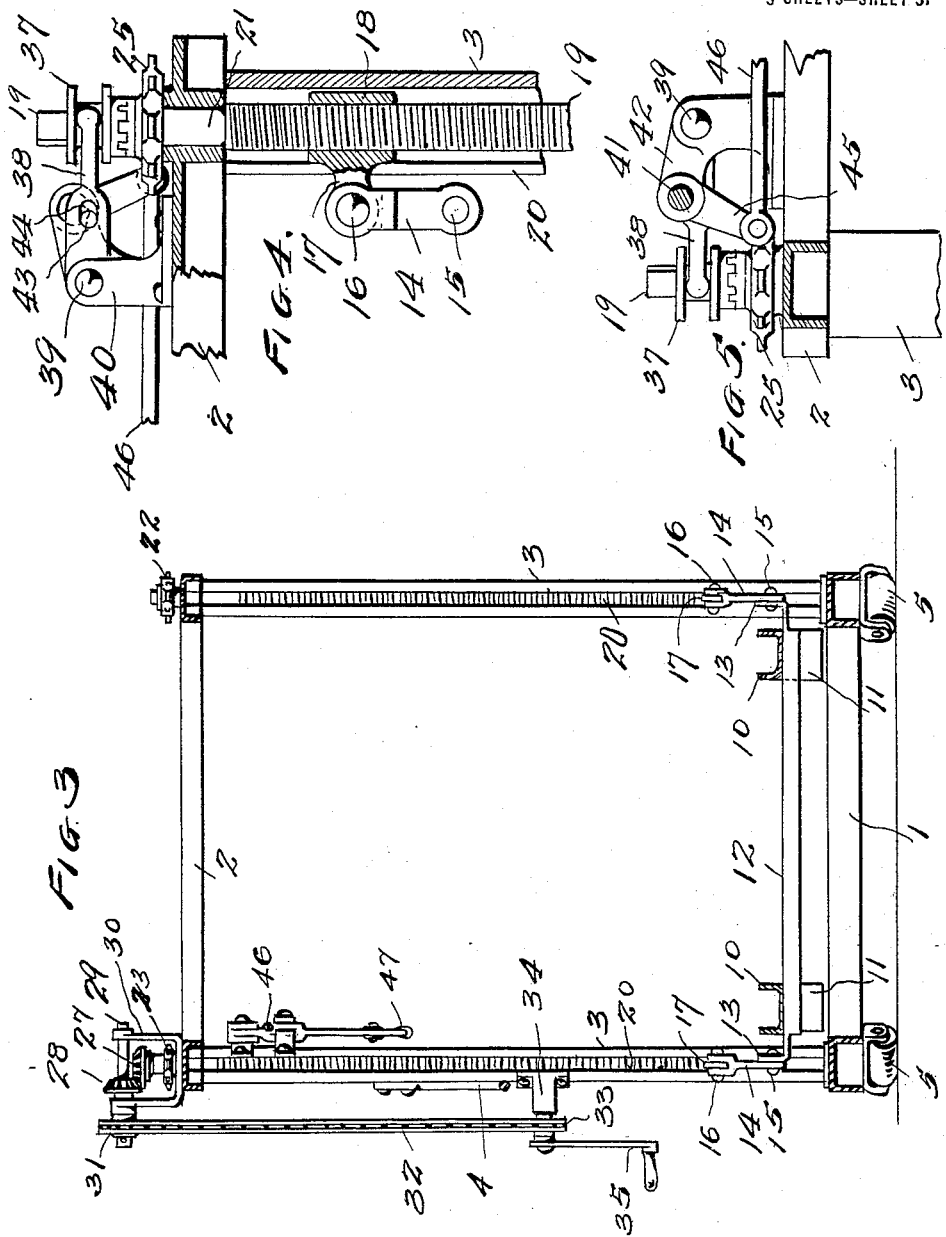
Witnesses
C. K. Davis
M. E. Moore
Inventor
EUGENE STRETCH
Attorney

UNITED STATES PATENT OFFICE.

EUGENE STRETCH, OF SHELBYVILLE, ILLINOIS.

AUTOMOBILE-HOIST.

1,205,490.    Specification of Letters Patent.    Patented Nov. 21, 1916.

Application filed November 10, 1915. Serial No. 60,676.

*To all whom it may concern:*

Be it known that I, EUGENE STRETCH, a citizen of the United States, residing at Shelbyville, in the county of Shelby and State of Illinois, have invented certain new and useful Improvements in Automobile-Hoists, of which the following is a specification.

My present invention relates to an improved automobile hoist, designed especially for use in garages, repair shops, and other similar places where the handling of automobiles and other vehicles is required in order to repair or work upon the automobiles.

The primary object of the invention is the provision of a device by means of which the vehicle or automobile may be bodily lifted from the floor or ground and adjusted to position so that it may be accessible to the repair man or inspector.

By the utilization of my hoist the automobile may be lifted to proper position so that its parts may be disassembled with facility, and the hoisting device itself is so constructed and arranged that it may be operated by one man with ease and skill.

The invention consists essentially in certain novel combinations and arrangements of parts whereby an efficient, economical and facile device is provided as will be pointed out hereinafter.

In the accompanying drawings I have illustrated one complete example of the physical embodiment of my invention constructed according to the best mode I have so far devised for the practical application of the principles of my invention, but it will of course be understood that I may change or alter the device in some particulars without departing from the spirit of my invention.

Figure 1 is a side elevation of an automobile hoist embodying my invention. Fig. 2 is a top plan view of Fig. 1. Fig. 3 is a transverse vertical section on line 3—3 of Fig. 1. Fig. 4 is an enlarged detail view partly in section showing a clutch operating device in connection with a portion of the lifting device. Fig. 5 is a similar view, from the opposite side of Fig. 4 showing the clutch operating connections. Fig. 6 is a transverse sectional view at line 6—6 Fig. 2 illustrating the central support of the hoist as a turn-table. Fig. 7 is an illustration of one of the portable supporting bars.

In the preferred embodiment of my invention as illustrated in the drawings the structure is made up practically of metal bars comprising a lower frame 1 rectangular in outline and preferably composed of channel bars, and an upper frame 2 of similar outline and of similar material. These two frames are rigidly connected by the four corner posts, 3, 3, 3, 3, and suitable brace rods 4 strengthen and brace the parts, while below each corner post, under the lower frame, a roller 5 is journaled, which is located on a radial line extending from the center of the center plate 6. This plate may be fixed to the floor or ground and has a vertically arranged screw bar 7 journaled therein. The bar 7 is threaded in a bearing plate 8 formed integral with or rigidly attached to the cross arm 9 which arm is securely fixed at its ends to the lower frame 1. Thus the entire structure may be held stationary by gravity, but when it is desired to shift the structure, by manipulating the screw bar the weight may be taken off the rollers and then the structure may be revolved bodily on the screw bar which forms a king pin, and the rollers facilitate and support the structure as it is revolved or rotated.

Within the fixed frame formed as described a supporting frame is suspended upon which the automobile is to be carried. This suspended frame comprises two longitudinally disposed, normally horizontal channel beams 10, 10, whose ends are turned down at 11, 11, and these beams form runways for the wheels of an automobile, the bent ends being provided so that the automobile may be elevated as it is run upon the suspended frame, it being understood of course that the extremities of the bent ends rest upon the floor and perform the function of skids. The channel portion of these beams is at the upper side, and the under sides of the beams are connected by rigidly fastened cross bars 12. These cross bars are also of channel construction, and their turned up ends 13 are perforated to form ears to which the suspending links 14 are pivoted at 15. There are four of these links, one at each of the ends of the two cross bars, and each link is pivoted as at 16 to a perforated lug 17 formed integral with a threaded nut 18. The four nuts 18 are cylindrical in form, hollow, and internally threaded to coact with a screw bar or threaded shaft 19 located in each of the hollow posts 3. In this manner the supporting frame is suspended at four corners, through the medium of the pivoted links and the nuts on the threaded, vertical shafts within the hollow or tubular posts. It will be noted that the posts are each slotted, as at 20 in order to accommodate the lugs 17 of the nuts 18 and when the threaded shafts are turned, the nuts are held against rotation by the engagement of the lugs with the edges or walls of the slots with the result that the nut is raised or lowered, depending upon the direction in which the threaded shaft is turned. These four shafts are journaled in the upper and lower frames of the structure, as at 21 in Fig. 4, and the shafts are freely revoluble in their bearings. For simultaneous operation of the threaded shafts I provide each shaft with a sprocket wheel as 22, 23, 24, and 25, and these sprockets are connected by the continuous chain 26 passing around the outside of the wheels as shown in Fig. 2. All four of the sprockets are located above the upper frame on their respective threaded shafts, but it should be noted that only sprockets 22 and 23 are fixed to revolve with their shafts. The two sprockets 24 and 25 are loose on their shafts so that they may be rendered inoperative to revolve their shafts when desired for a purpose to be described.

All four of the threaded shafts may be revolved synchronously through the actuation of the sprocket 23 and its shaft 19 which has a pair gears as 27 28 to actuate it. The bevel gear 27 is fixed at the upper end of the threaded shaft and the bevel gear 28 is fixed on the driving shaft 29 journaled in the bracket 30 fixed at the top of the upper frame. The driving shaft 29 is turned through the sprocket 31, the sprocket chain 32 and the sprocket wheel 33 journaled in a bracket 34 fixed to one of the corner posts. By means of the handle 35 the sprocket connections may be revolved to turn the gears, and through the gears the threaded shafts in their tubular posts are revolved. It is sometimes desirable to elevate one end of the suspended frame in order to locate the frame at an angle. For this purpose I provide the two loose sprockets 24 and 25 with clutch members as 36, 37, which are keyed to slide at the upper ends of the threaded shafts and to engage complementary members on the sprocket wheels. These spools or clutch members may be lifted to disengage the clutch by means of a pair of clutch levers or forks 38, 38, pivoted at 39 in brackets 40 at the upper side of the top frame, and the two levers or forks are caused to be lifted simultaneously or in unison by means of the rock shaft 41 which is journaled in brackets 42 and has at its ends eccentrically arranged pins 43 engaging in the slots 44 of the forks 38.

A crank arm 45 is fixed to the rock shaft and this arm is connected by the draw rod 46 to an actuating lever 47 pivoted on one of the corner posts. Thus, when the lever 47 is in position of Figs. 1 and 3 the clutches are engaged so that turning of the crank handle revolves the threaded shafts in unison and the suspended frame is lifted bodily and uniformly, or lowered, as the case may be. If, however it is desired to raise or elevate the left end of the suspended frame only, in order that the mechanic can work standing upon the underneath side of the rear or front of the car, as the case may be, the lever 47 is turned upwardly to the left in Fig. 1 which rocks the rock bar or shaft 41 causing the pivoted forks to disengage the clutches, with the result that the loose sprocket wheels 24 and 25 turn idly on their vertical shafts and the shafts are not revolved. The consequence is that the left end of the suspended frame is elevated, the pivoted links by which the frame is suspended allowing for this movement of the frame. To prevent the dislodgment of the car when the suspended frame is in an inclined position chains, as indicated by dotted lines 48 may be used to secure the car or automobile by its axles, and the suspending bars 49 (dotted lines Fig. 1) which depend from eyebolts 50 by the chains 51 may be employed to hold the body of a car in suspension while the frame of the car is disposed of by the suspended frame. The cranes 52, rotatably supported in the structure may be utilized for lifting the motor or other parts from the car or automobile.

What I claim is:—

1. The combination with a supporting structure including hollow, vertical posts and screw shafts therein, a non-rotatable nut on each shaft, a supporting frame, links suspending said frame from said nuts, means for revolving the shafts to vertically move the supporting frame, means whereby one end of the supporting frame may be held stationary while the other is lifted or lowered, said means consisting of clutches on certain of said shafts, a pair of clutch levers and forks pivoted in brackets secured on the supporting structure, a rock shaft for lifting said clutches out of engagement with the drive sprockets, and means for operating said rock shaft.

2. The combination with a supporting structure including hollow, vertical posts and screw shafts therein, a non-rotatable nut on each shaft, a supporting frame, links suspending said frame from said nuts, means for revolving the shafts to vertically move the supporting frame, means whereby one end of the supporting frame may be held stationary while the other is lifted or lowered, said means consisting of clutches on certain of said shafts, a pair of clutch levers and forks pivoted in brackets secured on the supporting structure, a rock shaft for lifting said clutches out of engagement with the drive sprockets, and means for operating said rock shafts, said means consisting of a quadrant mounted on the opposite end of said supporting structure and a lever pivoted to said quadrant.

3. The combination with a supporting structure including hollow, vertical posts and screw shafts therein, a non-rotatable nut on each shaft, a supporting frame, lugs on said supporting frame, lugs integral with said non-rotatable nuts, links connecting said lugs with said frame, thereby suspending said supporting frame from said non-rotatable nuts, means for revolving the shafts to vertically move the supporting frame, means whereby one end of the supporting frame may be held stationary while the other is lifted or lowered, said means consisting of clutches on certain of said shafts, a pair of clutch levers and forks pivoted in brackets secured on the supporting structure, a rock shaft for lifting said clutches out of engagement with the drive sprockets, and means for operating said rock shafts, said means consisting of a quadrant mounted on the opposite end of said supporting structure and a lever pivoted to said quadrant.

4. The combination with a supporting structure including hollow, vertical posts and screw shafts therein, a non-rotatable nut on each shaft, a supporting frame, lugs on said supporting frame, perforated lugs formed on and integral with said non-rotatable nuts, links connecting said lugs, thereby pivotally suspending said supporting frame from said non-rotatable nuts, means for revolving the shafts to vertically move the supporting frame, means whereby one end of the supporting frame may be held stationary while the other is lifted or lowered, said means consisting of clutches on certain of said shafts, brackets secured on the supporting structure, clutch levers and forks pivoted in said brackets, a rock shaft for lifting said clutches out of engagement with the drive sprockets, and means for operating said rock shafts, said means consisting of a quadrant mounted on the opposite end of said supporting structure, an operating lever pivoted to said quadrant and connections between said operating lever and rock shafts.

5. The combination with a supporting structure including hollow, vertical posts and screw shafts therein, a non-rotatable nut on each shaft, a supporting frame, lugs on said supporting frame, perforated lugs formed on and integral with said non-rotatable nuts, links connecting said lugs, thereby pivotally suspending said supporting frame from said non-rotatable nuts, means for revolving the shafts to vertically move the supporting frame, means whereby one end of the supporting frame may be held stationary while the other is lifted or lowered, said means consisting of clutches on certain of said shafts, brackets secured on the supporting structure, clutch levers and forks pivoted in said brackets, a rock shaft for lifting said clutches out of engagement with said driving means, and means for operating said rock shafts, said means consisting of a quadrant mounted on the opposite end of said supporting structure, an operating lever pivoted to said quadrant and connections between said operating lever and rock shafts, said connections consisting of a crank arm fixed to said rock shafts and a draw rod connecting said crank arm and said operating lever.

6. The combination with a supporting structure including hollow, vertical posts and screw shafts therein, a non-rotatable nut on each shaft, a supporting frame, cross bars near the ends of said supporting frame, struck up portions on the ends of said cross bars forming lugs, perforated lugs formed on and integral with said non-rotatable nuts, links connecting said lugs, thereby pivotally suspending said supporting frame from said non-rotatable nuts, means for revolving the shafts to vertically move the supporting frame, means whereby one end of the supporting frame may be held stationary while the other is lifted or lowered, said means consisting of clutches on certain of said shafts, brackets secured on the supporting structure, clutch levers and forks pivoted in said brackets, a rock shaft for lifting said clutches out of engagement with said driving means, and means for operating said rock shafts, said means consisting of a quadrant mounted on the opposite end of said supporting structure, an operating lever pivoted to said quadrant and connections between said operating lever and rock shafts.

In testimony whereof I affix my signature in the presence of two witnesses.

EUGENE STRETCH.

Witnesses:
 WM. H. CRAIG,
 LEWIS P. CRAIG.

Copies of this patent may be obtained for five cents each, by addressing the "Commissioner of Patents, Washington, D. C."